(12) United States Patent
Ciarlette et al.

(10) Patent No.: US 12,357,008 B2
(45) Date of Patent: Jul. 15, 2025

(54) REFINED POULTRY FAT PRODUCT AND USES THEREOF

(71) Applicant: Pet Food Solutions, LLC, Mokena, IL (US)

(72) Inventors: David G. Ciarlette, Mokena, IL (US); Floyd W. Carmichael, Mokena, IL (US)

(73) Assignee: Pet Food Solutions, Inc., Mokena, IL (US)

( * ) Notice: Subject to any disclaimer, the term of this patent is extended or adjusted under 35 U.S.C. 154(b) by 622 days.

(21) Appl. No.: 16/786,128

(22) Filed: Feb. 10, 2020

(65) Prior Publication Data

US 2020/0253253 A1    Aug. 13, 2020

Related U.S. Application Data

(60) Provisional application No. 62/804,954, filed on Feb. 13, 2019.

(51) Int. Cl.
*A23L 13/50* (2016.01)
*A23D 9/04* (2006.01)
(Continued)

(52) U.S. Cl.
CPC .............. *A23L 13/52* (2016.08); *A23D 9/04* (2013.01); *A23K 10/26* (2016.05); *A23K 50/42* (2016.05); *A23L 5/21* (2016.08)

(58) Field of Classification Search
CPC .......... A23D 9/00; A23D 9/007; A23D 9/013; A23D 9/02; A23D 9/04; A23D 9/05; A23D 9/06; A23L 5/20; A23L 5/21
See application file for complete search history.

(56) References Cited

U.S. PATENT DOCUMENTS

| 2,150,732 A | 3/1939 | Thurman |
| 5,436,018 A | 7/1995 | Massie |

(Continued)

FOREIGN PATENT DOCUMENTS

| CN | 107446696 | 12/2017 |
| WO | 2010/11418 | 9/2015 |

OTHER PUBLICATIONS

Kiel, Location of *Salmonella* in Poultry Fat Intended for Use in Pet Food and the Influence of Fat's Physical Characteristics On *Salmonella* Prevalence and Growth, MS Thesis, Colorado State University, Fall 2016, 68 pages.
(Continued)

*Primary Examiner* — Erik Kashnikow
*Assistant Examiner* — Bryan Kim
(74) *Attorney, Agent, or Firm* — POLSINELLI PC

(57) ABSTRACT

Refined poultry fat comprising less than about 300 ppm of minerals and metals, wherein the refined poultry fat is resistant to bacterial growth when challenged with a bacterial species. The refined poultry fat is prepared from rendered poultry fat by a process comprising introducing moisture into the rendered poultry fat product to form a hydrated poultry fat product; (b) agitating and heating the hydrated poultry fat product such that droplets of water are dispersed throughout and coalesce with water-soluble impurities and/or particulate impurities in the hydrated poultry fat product to form a plurality of water-laden particles; and (c) removing the plurality of water-laden particles. The refined poultry fat can be used as an ingredient in the animal food industry, or can be used in the renewable energy industry.

18 Claims, 6 Drawing Sheets

(51) Int. Cl.
    *A23K 10/26*     (2016.01)
    *A23K 50/42*     (2016.01)
    *A23L 5/20*     (2016.01)

(56) References Cited

U.S. PATENT DOCUMENTS

| | | | | |
|---|---|---|---|---|
| 7,902,388 | B2* | 3/2011 | Heise | C11B 3/04 |
| | | | | 426/601 |
| 8,580,119 | B1* | 11/2013 | Shah | C11B 3/10 |
| | | | | 585/800 |
| 8,648,210 | B2* | 2/2014 | Hujanen | C10L 1/026 |
| | | | | 554/20 |
| 8,802,879 | B2 | 8/2014 | Kumar | |
| 8,980,351 | B2* | 3/2015 | Ulahanan | C11B 3/008 |
| | | | | 426/423 |
| 9,404,064 | B2* | 8/2016 | Guay | C11B 3/16 |
| 9,738,842 | B2 | 8/2017 | Scott | |
| 11,028,336 | B2* | 6/2021 | Malm | C11B 3/001 |
| 11,118,133 | B2* | 9/2021 | Slade | C10G 67/10 |
| 11,540,530 | B2* | 1/2023 | Kato | A23L 5/20 |
| 2019/0008749 | A1* | 1/2019 | Harris | C10M 145/40 |

OTHER PUBLICATIONS

Sharma et al., Animal fat-Processing and Its Quality Control, J Food Process Technol, 2013, 4: 252. doi:10.4172/2157-7110.1000252:8, 5 pages.

Kalapathy, U. et al., "A New Method for Free Fatty Acid Reduction in Frying Oil Using Silicate Films Produced from Rice Hull Ash," JAOCS, vol. 77, No. 6, 2000, pp. 593-598.

* cited by examiner

1. Poultry Fat (PF)  2. Leftover Residue (LR)  3. Product (RCF)

US 12,357,008 B2

REFINED POULTRY FAT PRODUCT AND USES THEREOF

CROSS-REFERENCE TO RELATED APPLICATION

This application claims the benefit of U.S. Provisional Application No. 62/804,954, filed Feb. 13, 2019, which is hereby incorporated by reference in its entirety.

FIELD

The present disclosure is related to refined poultry fat of high purity, products comprising the refined poultry fat, and methods of purifying the refined poultry fat from crude rendered poultry fat.

BACKGROUND

Non-edible byproducts of carcasses from animal processing facilities are rendered or recycled into stable and useful products such as protein meals (e.g., meat meal, bone meal, blood meal, feather meal, etc.) and fats (e.g., tallow, lard, poultry fat, etc.). The raw materials used in rendering, however, are frequently contaminated with bacteria, some of which are pathogenic to animals and humans. The rendering industry has expended significant effort to reduce risk of producing products with bacterial contamination. Despite the lower risks of contamination, rendered animal fats and products comprising them can still provide hospitable environments for bacteria growth. Thus, there is a need for purified animal fat products that are not only free of bacterial contamination, but also are unable to sustain bacterial growth.

SUMMARY

Among the various aspects of the present disclosure is the provision of refined poultry fat products having a mineral and metal content of less than 300 ppm, wherein the refined poultry fat products are prepared from rendered poultry fat products, and the refined poultry fat products are resistant to bacterial growth when challenged with a bacterial species.

Another aspect of the present disclosure encompasses pet food products comprising the refined poultry fat product disclosed herein.

Yet another aspect of the present disclosure provides refined poultry fat products comprising less than 300 ppm of minerals and metals, wherein the products are prepared from rendered poultry fat products by processes in which water-soluble impurities and particulate impurities in the rendered poultry fat coalesce with particles of water to form water-laden particles, and the water laden-particles are removed to form the refined poultry fat products.

Still another aspect of the present disclosure provides processes for preparing the refined poultry fat products disclosed herein. The processes comprise (a) introducing water or steam into the rendered poultry fat product to form a hydrated poultry fat product; (b) agitating and heating the hydrated poultry fat product to a temperature of less than about 100° C. such that droplets of water are dispersed throughout and coalesce with water-soluble impurities and particulate impurities in the hydrated poultry fat product to form a plurality of water-laden particles; and (c) removing the plurality of water-laden particles, thereby forming the refined poultry fat products.

A further aspect of the present disclosure provides a refined poultry fat product prepared from a rendered poultry fat, wherein the refined poultry fat product has a reduced content of a carbon-based material relative to the rendered poultry fat.

Other aspects and iteration of the present disclosure are described in more detail below.

DETAILED DESCRIPTION

Figure 1:
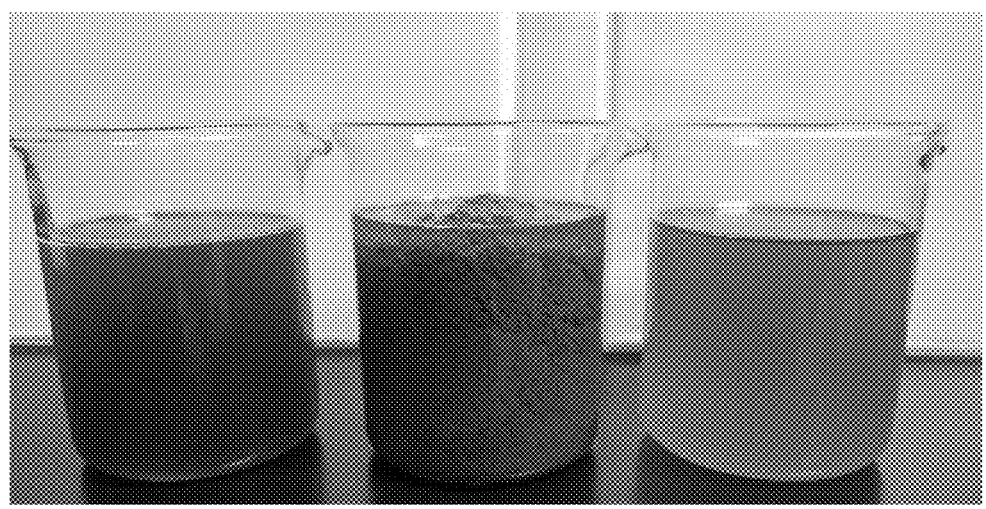
FIG. 1 shows an image of beakers containing the starting material, i.e., rendered poultry fat (PF), and the refined poultry fat (RCF) and leftover residue (LR) prepared by the process disclosed herein.

The present disclosure provides refined poultry fat that is prepared from rendered poultry fat, wherein the refined poultry fat has a mineral and/or metal content of less than 300 ppm and the refined poultry fat is resistant to bacterial growth when challenged with bacteria. The refined poultry fat is suitable for use in animal food or feed products, such as, e.g., pet foods. The refined poultry fat also may be used as a biogenic feedstock in the renewable energy industry. Also provided herein are processes for preparing the refined poultry fat from commercial grade rendered poultry fat.

(I) Refined Poultry Fat

One aspect of the present disclosure provides a refined poultry fat product that is purified from a rendered poultry fat product. The refined poultry fat is of high quality and purity. In particular, the refined poultry fat product has low levels of minerals and/or metals, has no detectable bacterial contamination, and is resistant to bacterial growth when challenged with bacteria.

(I)(a) Composition

The refined poultry fat disclosed herein has a combined mineral and metal content of less than 300 ppm. In some embodiments, the mineral/metal content is less than 280 ppm, less than 260 ppm, less than 240 ppm, less than 220 ppm, less than 200 ppm, less than 180 ppm, less than 160 ppm, less than 140 ppm, less than 120 ppm, less than 100 ppm, less than 80 ppm, less than 60 ppm, less than 40 ppm, less than 20 ppm, or less than 10 ppm.

Minerals and/or metals that may be present in the refined poultry fat include arsenic, boron, cadmium, calcium, chromium, cobalt, copper, fluoride, germanium, iodine, iron, lead, lithium, magnesium, manganese, molybdenum, nickel, nitrogen, mercury, phosphorous, potassium, rubidium, selenium, silicon, sodium, strontium, sulfur, thallium, tin, titanium, vanadium, and zinc. In some embodiments, the minerals and/or metals present in the refined poultry fat may be chosen from calcium, iron, lead, manganese, magnesium, phosphorus, sulfur, zinc, or combinations thereof. In specific embodiments, the minerals and/or metals present may include calcium, iron, lead, magnesium, phosphorus, sulfur, or combinations thereof.

The refined poultry fat disclosed herein may have reduced levels of carbon based material relative to the rendered poultry fat from which it is purified. The carbon based material may be nucleic acids (e.g., DNA and/or RNA), amino acids, proteins, carbohydrates, sugars, or combinations thereof. In general, the carbon based material is other than a fat or lipid. In some embodiments, the carbon based material may be a nucleic acid, such as genomic DNA. The genomic DNA may be derived from one or more microbes such as bacteria, fungi, archaea, protists, viruses, etc. In some embodiments, the carbon based material may be bacterial genomic DNA. The levels of bacterial genomic DNA may be reduced in the refined poultry fat relative to the unpurified rendered poultry fat. Additionally, the bacterial genomic DNA present in the refined poultry fat may be derived from different populations of bacteria as compared to the unpurified rendered poultry fat. As an example, the refined poultry fat may have genomic DNA derived from a reduced diversity of bacterial species than the unpurified rendered poultry fat.

In certain embodiments, the carbon based material may be one or more microbes such as bacteria, fungi, archaea, protists, viruses, etc. In some embodiments, the carbon based material may be bacteria. For example, the refined poultry fat may have fewer types of bacteria (i.e., reduced diversity) than the unpurified rendered poultry fat. Additionally, the refined poultry fat may have reduced levels of total bacteria (i.e., reduced concentration or density of total bacteria) relative to the unpurified rendered poultry fat.

In general, the refined poultry fat disclosed herein is free of *Salmonella* and *Listeria* contamination. The refined poultry fat may also be free of *Clostridium* and/or *Streptococcus*.

In embodiments in which the refined poultry fat consists of chicken fat, the fatty acid profile of the refined product mirrors that of chicken fat. In particular, chicken fat comprises about 30.5% saturated fatty acids (i.e., 23% palmitic acid, 5.5% stearic acid, 1% myristic acid, and 1% lauric acid), 45.5% monounsaturated fatty acids (i.e., 40% oleic acid, 5% palm itoleic acid, and 0.5% gadoleic acid), and 23.5% polyunsaturated fatty acids (i.e., 21% linoleic acid and 2.5% linolenic acid).

The refined poultry fat typically has a free fatty acid (FFA) content of less than about 15%. In certain embodiments, the FFA content of the refined poultry fat may be less than about 10%, less than about 8%, less than about 6%, less than about 4%, less than about 3%, less than about 2%, or less than about 1%.

Additionally, the refined poultry fat generally has a moisture, impurities, and unsaponifiables (MIU) content of less than about 2% by weight. In some embodiments, the MIU may be less than about 1.8%, less than about 1.6%, less than about 1.4%, less than about 1.2%, less than about 1.0%, less than 0.8%, less than about 0.6%, less than about 0.4%, or less than about 0.2% by weight. In some embodiments, the refined poultry fat has a lower level of insoluble impurities and a higher level of moisture than the rendered poultry fat from which it was purified.

In various embodiments, the refined poultry fat may have a moisture/water content of less than about 2%, less than about 1.5%, less than about 1% less than about 0.8%, less than about 0.6%, less than about 0.4%, less than about 0.2%, or less than about 0.1% by weight.

In general, the refined poultry fat has a peroxide value of less than about 10 milliequivalents (mEq)/kg. In various embodiments, the peroxide value of the refined poultry fat may be less than about 8 mEq/kg, less than about 6 mEq/kg, less than about 5 mEq/kg, less about 4 mEq/kg, about 3 mEq/kg, less than about 2 mEq/kg, or less than about 1 mEq/kg.

The refined poultry fat has reduced turbidity (or increased clarity) as compared to unpurified rendered poultry fat (see FIG. 1). Turbidity (i.e., opaqueness, cloudiness, murkiness) is due to suspended solids or particles and dissolved colored material that scatter light. Turbidity can be measured with a turbidity meter, which uses an optical scatter-detection technique to provide a qualitative measure of turbidity/clarity.

In general, the color value (i.e., relative lightness or darkness of a color) of the refined poultry fat is reduced relative to unpurified rendered poultry fat (see FIG. 1). The color value can be measured with the Gardner color scale, which allows for standardized color measurement of yellow to brown liquids. The Gardner Color scale ranges from 0 (distilled water) through yellow to deep amber (18). In some embodiments, the refined poultry fat has a Gardner color score of about 10 or less.

The refined poultry fat also has a reduced p-anisidine value relative to unpurified rendered poultry fat. The p-anisidine value is the number of secondary products of lipid compounds oxidation which are formed due to breakdown of peroxides and hydroperoxides. In general, the p-anisidine value of refined poultry fat may range from about 3 to 4, whereas that of the unpurified rendered poultry fat may be greater than 11.

(I)(b) Properties

The refined poultry fat disclosed herein is resistant to bacterial growth when challenged with bacterial species. Stated another way, the refined poultry fat may be bacteriostatic.

In some embodiments, the refined poultry fat exhibits little or no bacterial grow when challenged with *Aeromonas* (*A. caviae*, *A. hydrophila*, *A. salmonicida-masoucida*, *A. schuberti*), *Brochothrix* (*B. thermosphacta*), *Buttiauxella*, *Campylobacter* (*C. jejuni*, *C. coli*), *Clostridium* (*C. perfringens*) *Enterococcus* (*E. viikkiensis*, *E. saigonensis*), *Escherichia coli*, *Hafnia* (*H. alvei*, *H. paralvei*), *Lactobacillus* (*L. oligofermentans*), *Leuconostoc gelidum* subsp. *Gasicomitatum*, *Listeria* (*L. innocua*, *L. monocytogene*, *L. welshimeri*, *L. grayi*, *L. ivanovii*), *Pseudomonas* (*P. fragi*, *P. lundensis*, *P. fluorescens*), *Rahnella*, *Salmonella enterica* (serotypes Enteritidis, Senftenberg, Typhimurium), *Salmonella bongori*, *Serratia* (*S. fonticola*, *S. grimesii*, *S. liquefaciens*, *S. proteamaculans*, *S. quinivorans*), *Staphylococcus* (*S. aureus*), *Yersinia*, or combinations thereof. In certain embodiments, the refined poultry fat displays little or no bacterial growth when challenged with *Salmonella enterica* (serotypes Enteritidis, Senftenberg, Typhimurium), *Salmonella bongori*, *Campylobacter* (*C. jejuni*, *C. coli*), *Listeria* (*L. innocua*, *L. monocytogene*, *L. welshimeri*, *L. grayi*, *L. ivanovii*), *Clostridium perfringens*, *Staphylococcus aureus*, *Escherichia coli*, or combinations thereof. In specific embodiments, the refined poultry fat displays little or no bacterial growth when challenged with *Salmonella* or *Listeria*.

The refined poultry fat may exhibit resistance to bacterial growth in the presence of water content above about 1% by weight. In some embodiments, the refined poultry fat may be resistant to growth of added bacteria in the presence of more than about 1.5% of water, more than about 2% of water, more than about 3% of water, more than about 4% of water, more than about 5% of water, more than about 6% of water, more than about 7% of water, more than about 8% of water, more than about 9% of water, or more than about 10% of water by weight.

(I)(c) Uses

The refined poultry fat disclosed herein has a variety of uses. For example, the refined poultry fat may be an ingredient in animal foods or feedstocks, may be used as a biogenic feedstock in the renewable energy industry or refinery co-processing, or may be used as bio-based raw ingredients in the oleochemical industry.

In some embodiments, the refined poultry fat may be used as a fat source, flavoring agent, and/or palatability enhancer in animal foods or feedstocks. Because chicken fat has a high concentration of linoleic acid, an omega-6 fatty acid, the refined poultry fat may provide omega fatty acids to the animal food or feedstock. In general, the refined poultry fat disclosed herein is not for human consumption.

The animal foods or feedstocks comprising the refined poultry fat may be formulated for companion or support animals, zoological animals, research animals, or livestock or agricultural animals. Non-limiting examples of companion or support animals include dogs, cats, rabbits, gerbils and other rodents, horses, birds, reptiles, amphibians, and fish. As used herein, a "zoological animal" refers to an animal that may be found in a zoo. Such animals may include non-human primates, large cats, wolves, bears, hippos, kangaroos, etc. In still another embodiment, the animal may be a research or laboratory animal. Non-limiting examples of a research of laboratory animal include rodents (e.g., mice, rats, guinea pigs, hamsters, etc.), rabbits, cats, dogs, and non-human primates. In certain other embodiments, the animal may be a livestock or agricultural animal. Non-limiting examples of suitable livestock or agricultural animals may include cows, cattle, pigs, goats, sheep, poultry, llamas, alpacas, aquatic animals (e.g., farmed fish and shellfish), and the like.

In specific embodiments, the refined poultry fat may be used in pet food products. The pet food products comprising the refined poultry fat appear to have improved palatability as compared to those comprising rendered poultry fat, which may be due to the lower p-anisidine values.

The pet food comprising the refined poultry fat may be dry (e.g., kibbles, pellets, and the like), wet (e.g., canned), or semi-moist (e.g., in pouches). Also included are pet treats (i.e., biscuits, chews, twists, cookies, snacks, and so forth). In addition to the refined poultry fat, the pet food or treat may further comprise meat, animal protein meal, bone meal, grains (ground corn, wheat, soybean, rice, etc.), grain meals (corn meal, gluten meal, soybean meal, and the like), vegetables, vegetable fats, vitamins, minerals, and combinations thereof.

In other embodiments, the refined poultry fat disclosed herein may be used as a biogenic feedstock in the renewable energy industry. For example, the refined poultry fat may be used in co-processing with petroleum distillates in petroleum refiner process units to produce renewable hydrocarbon fuel. Alternatively, the refined poultry fat may be converted to a biofuel (e.g., FAME biodiesel).

In still other embodiments, the refined poultry fat may be used in the oleochemical industry. Suitable applications include the production of personal care products (e.g., soaps, shampoos, cosmetics), lubricants, plastics, biopolymers, cleaning agents, coatings, glues, softeners, emulsifiers, additives, rubber, paper, paint, and so forth.

(II) Pet Food Comprising Refined Poultry Fat

A further aspect of the present disclosure encompasses pet foods or pet treats comprising the refined poultry fat disclosed herein. As detailed above, the pet food or pet treat may further comprise meat, animal protein, meal, bone meal, grains (ground corn, wheat, soybean, rice, etc.), grain meals (corn meal, gluten meal, soybean meal, and the like), vegetables, vegetable fats, vitamins, minerals, and combinations thereof. The pet food may be dry (e.g., kibbles, pellets, crumble, and the like), wet (e.g., canned), or semi-moist (e.g., in pouches). The pet treat may be in the form of biscuits, chews, twists, crunch, cookies, snacks, and so forth). In specific embodiments, the pet food comprises dry kibbles. Dry pet food or pet treat generally comprise less than 20% moisture by weight.

In general, the pet food comprising the refined poultry fat has increased palatability as compared to pet food comprising rendered poultry fat. The palatability of a food is generally defined as its degree of acceptability to an animal, as determined by the sensory response to specific chemical and physical characteristics, namely smell, taste and texture. The palatability of a food may be affected by the absence of anti-palatability factors such as rancidity, moldiness, volatile chemical components, and the like. Palatability can be assessed by measuring the consumption of one food relative to another. In general, animals show a clear preference for one food by consuming twice as much of one food as compared to another food. This is termed the 2:1 consumption ratio or the 0.667 intake ratio. In some embodiments, pet food comprising refined poultry fat may have an intake ratio of greater than about 0.6667, greater than about 0.70, greater than about 0.75, greater than about 0.80, greater than about 0.85, greater than about 0.90, or greater than about 0.95.

The pet food or pet treat may be prepared by retorting, baking, or extrusion. In general, the process comprising heating the ingredients to a temperature that is high enough to cook the ingredients and kill any microorganisms. For example, an extrusion process comprises using heat, e.g., at a temperature of greater than 92° C., pressure, and steam to rapidly cook the ingredients and transform them into a dried and coated product.

(III) Methods for Preparing Refined Poultry Fat

A further aspect of the present disclosure provides processes for preparing the refined poultry fat disclosed herein from rendered poultry fat. In general, the process comprises (a) introducing water or steam into the rendered poultry fat product to form a hydrated poultry fat product; (b) agitating and heating the hydrated poultry fat product to a temperature of less than about 100° C. such that droplets of water are dispersed throughout and coalesce with water-soluble impurities and/or particulate impurities in the hydrated poultry fat product to form a plurality of water-laden particles; and (c) removing the plurality of water-laden particles, thereby forming the refined poultry fat product.

In particular, the process removes insoluble impurities and water soluble impurities such as minerals and/or metals. The purification process does not alter the content of free fatty acids, and the fatty acid profile of the fat is not changed during the purification process.

The rendered poultry fat used in the processes disclosed herein is commercial grade fat prepared by rendering or extracting fat from poultry tissue and byproducts. In general, the rendered poultry fat used in the processes disclosed herein has a total moisture, impurity, unsaponifiable (MIU) content of less than 2%.

The first step of the process comprises introducing steam or water into the rendered poultry fat, thereby forming a hydrated poultry fat product. In some embodiments, the rendered poultry fat may be transferred to a steam injection chamber. The rendered poultry fat may be heated to a temperature of about 40° C. to about 60° C. to facilitate transfer of the rendered poultry fat. Steam may be introduced into the chamber via a steam injector. The amount of steam or water introduced into the rendered poultry fat can and will vary. In general, sufficient steam may be introduced such that the hydrated rendered poultry fat product has water content from about 2% to about 5% by weight. In specific embodiments, the water content of the hydrated rendered poultry fat may range from about 2.5% to about 3.5%, or from about 2.8% to about 3.2% by weight. During the steam injection step, the temperature of the rendered poultry fat may be increased to a temperature ranging from about 75° C. to about 95° C.

The next step of the process comprises agitating and heating the hydrated poultry fat such that droplets of water are dispersed throughout and coalesce with water-soluble impurities and/or particulate impurities in the hydrated poultry fat product to form a plurality of water-laden particles. The agitating may be conducted by passing the hydrated poultry fat through a static mixer. Those of ordinary skill in the art are knowledgeable of other means for mixing or agitating the hydrated poultry fat. In general, the hydrated poultry fat is heated to a temperature of less than about 150° C. In various embodiments, the hydrated poultry fat may be heated to a temperature of less than about 140° C., less than about 130° C., less than about 120° C., less than about 110° C., or less than about 100° C. In certain embodiments, the hydrated poultry fat may be heated to a temperature from about 90° C. to about 110° C., from about 95° C., from about 95° C. to about 105° C., or from about 98° C. to about 102° C. In other embodiments, the hydrated poultry fat may be heated to about 90° C., about 92° C., about 94° C., about 96° C., about 97° C., about 98° C., about 99° C., about 99.5° C., about 99.7° C., or about 99.9° C. In exemplary embodiments, the hydrated poultry fat is heated to a temperature of less than about 100° C.

The next step of the process comprises removing the moisture-laden particles from the agitated mixture of hydrated poultry fat, thereby forming the refined poultry fat product. For this, the agitated mixture of hydrated poultry fat may be transferred to a settling chamber such that the heavy moisture-laden particles may settle to the bottom of the chamber by gravity. During this settling time, the temperature of the mixture may be reduced to about 80-85° C., or less than about 80° C. The duration of the settling in the settling chamber can and will vary depending upon a variety of factors including, e.g., the purity of the original rendered poultry fat, the amount of moisture added, and so forth. The upper portion of the settling mixture may be sampled periodically to determine the extent of settling of the water-laden particles. Once the gravity settling is deemed complete, the clear upper layer may be removed and subjected to an additional centrifugation step to remove any residual water-laden particles.

The clarity of final product may be monitored by measuring the turbidity of a sample using a turbidity meter. The final product is the refined poultry fat as detailed above in section (I).

Definitions

When introducing elements of the embodiments described herein, the articles "a", "an", "the" and "said" are intended to mean that there are one or more of the elements.

The terms "comprising", "including" and "having" are intended to be inclusive and mean that there may be additional elements other than the listed elements.

The term "free fatty acids (FFA)" refers to fatty acids not esterified to glycerol. Hydrolysis may occur as either enzymatic lipolysis during storage or prior to rendering, or as autocatalytic hydrolysis.

The term "iodine value (IV)" refers to the grams of iodine taken up by 100 grams of fat. It is a measure of degree of saturation of fatty acids (each double bond will take up two atoms of iodine).

The term "mineral and metal" as used herein encompasses metals (e.g., calcium, magnesium, etc.) and nonmetals (e.g., phosphorus, sulfur, etc.).

The term "moisture, impurities, and unsaponifiables (MIU)" is a measure of fat purity. Pure fat is virtually free of moisture, but some condensation moisture is unavoidable with any feed fat. "Impurities" (also called "insoluble impurities") refers to filterable materials insoluble in a hydrocarbon, such as particles of hair, bone, hide, minerals, metals, etc. "Unsaponifiables" refers to that material which is soluble in a hydrocarbon but does not react with sodium or potassium hydroxide to form soap. Examples of unsaponifiables include sterols (e.g., cholesterol), pigments, fat soluble vitamins, fatty alcohols, fatty-fatty esters, waxes, mineral oils, pesticides, etc.

The term "peroxide value" is a measure of the rancidity in unsaturated fats and oils. The peroxide value is defined as the milliequivalents (mEq) of peroxide oxygen per 1 kilogram of fat or oil. Fresh fats generally have peroxide values of less than 10 mEq/kg.

The term "rendered poultry fat" refers to the fat obtained from the byproducts of poultry carcasses in the commercial process of rendering or extracting. The rendered poultry fat may consist of chicken fat, it may comprise another poultry fat (e.g., turkey, duck, goose, etc.), or it may comprise a mixture of poultry fats (i.e., chicken, turkey, duck, goose, etc.). Industry standards specify that rendered poultry fat contains a maximum of 2% of moisture, impurities, unsaponifiables (MIU) combined. The impurities may include bone fragments, feather/claw fragments, fibers, inorganic matter, soil, and the like. The presence of bone and/or feather fragments can result in elevated levels of calcium, phosphorus, for example, in the rendered poultry fat.

The term "total fatty acids (TFA)" is another measure of the purity of a fat. Triglycerides contain approximately 90% fatty acid and 10% glycerol.

Having described the invention in detail, it will be apparent that modifications and variations are possible without departing from the scope of the invention defined in the appended claims.

EXAMPLES

The following examples illustrate various embodiments of the present disclosure.

Example 1: Preparation of Refined Poultry Fat

Commercial-grade rendered poultry fat (consisting of chicken fat) having maximum moisture, impurities and unsaponifiables (MIU) content of 2% was pumped into a steam injection chamber. Steam was injected into the steam injection chamber to form a hydrated poultry fat mixture. As steam was injected, the steam condensed and fell through the poultry fat and collapsed around small particles of impurities present in the poultry fat to produce larger water-laden particles. The hydrated poultry fat mixture was passed through a static mixer, which ensured vigorous agitation of the mixture. The steam injection step and agitation step were performed under back-pressure to ensure complete condensation of the steam. The condensed steam collected particulates and water-soluble impurities. The mixture was passed through a heat exchanger, and then passed into a settling chamber. Here, the moisture-laden impurities and minerals settled to the bottom of the chamber due to the force of gravity. The mixture was cooled and the impurities were allowed to settle. The product was periodically sampled to determine the point at which maximum settling has occurred. At that point, the upper, clear, non-particulate fraction was pumped to a computer-controlled vertical centrifuge for removal of any remaining moisture-laden particles. The turbidity of the final refined poultry fat product was assessed using an ultraviolet turbidity meter.

FIG. 1 presents images of the starting rendered poultry fat (PF), the leftover residue (LR) that settled out during the process, and the refined poultry (chicken) fat product (RCF).

Example 2: Analysis of Rendered Poultry Fat and Refined Poultry Fat

Several samples of the rendered poultry fat (PF) and the refined poultry (chicken) fat (RCF) essentially prepared as described in Example 1 were analyzed with regard to MIU levels, fat properties and fat quality, and levels of minerals and metals. The results are presented below in Tables 1-3.

TABLE 1

MIU Content

| | Moisture (%) | Impurities (%) | Unsaponifiables (%) | MIU (%) |
|---|---|---|---|---|
| PF-1 | 0.12 | 0.18 | 0.68 | 0.98 |
| RCF-1 | 0.26 | 0.06 | 0.73 | 1.05 |
| PF-2 | 0.08 | 0.16 | 0.55 | 0.79 |
| RCF-2 | 0.44 | 0.04 | 0.85 | 1.33 |

TABLE 2

Fat Properties and Fat Quality

| | Iodine Value | FFA (%) | Peroxide Value | *Salmonella* (per 25 g) |
|---|---|---|---|---|
| PF-1 | 80.7 | 1.8 | 1.0 | Negative |
| RCF-1 | 80.9 | 2.0 | 1.2 | Negative |

TABLE 3

Mineral and Metal Levels.

| | Calcium (ppm) | Phosphorus (ppm) | Iron (ppm) | Lead (ppm) | Sulfur (ppm) |
|---|---|---|---|---|---|
| PF-1 | 68.1 | 256.3 | 1.8 | nd* | 38.9 |
| RCF-1 | 1.4 | 14.7 | 1.2 | nd | 11.5 |
| PF-2 | 9.4 | 276.2 | 3.0 | <1 | 39.2 |
| RCF-2 | 1.6 | 18.9 | <1 | <1 | 30.7 |

*Not determined

The purification process increased the moisture content but reduced the content of impurities by 4- to 6-fold in the refined poultry fat. The fat properties and fat qualities were not affected by the purification process. The purification process also significantly reduced the levels of calcium and phosphorus.

Example 3: *Salmonella* Challenge

The ability of rendered poultry fat and refined poultry fat to support *Salmonella* growth was analyzed by incubating samples of each in the absence or presence of *Salmonella*. Control (i.e., water) and test samples (i.e., rendered poultry fat (PF), refined poultry (chicken) fat (RCF), and leftover residue (LR)) were added to 96-well plates, and *Salmonella* serotype Typhimurium ssp. Newport (ATCC 37869) was added to half of the samples. The cells were incubated under standard conditions and bacterial growth was monitored by the optical density at 590 nm using a multiwell plate reader over a period of about 18 hours.

Figure 2A:
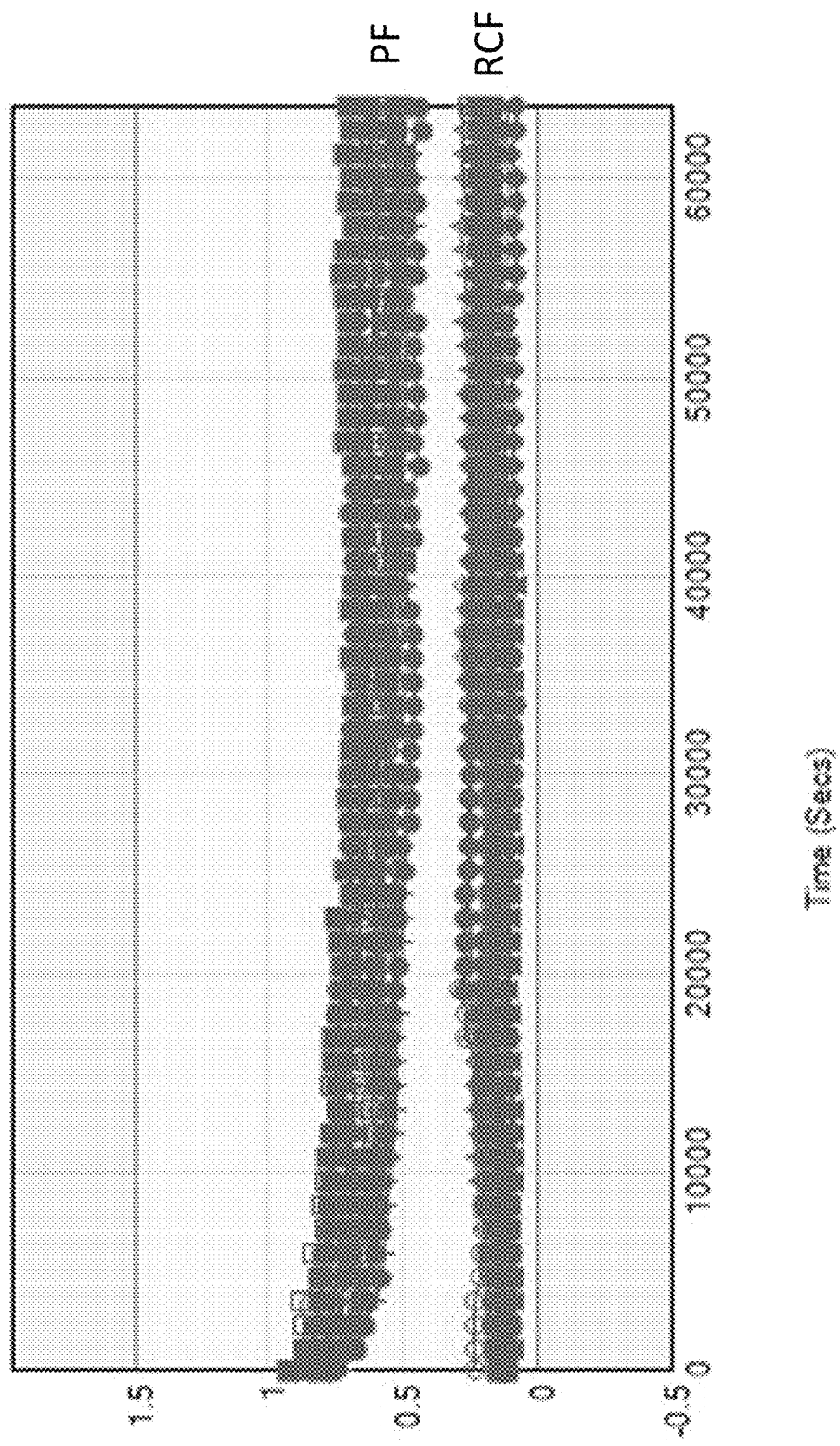
FIG. 2A presents the optical density (at 590 nm) of poultry fat (PF) and refined poultry fat (RCF) samples over 18 hours incubated without *Salmonella* as measured
Figure 2B:
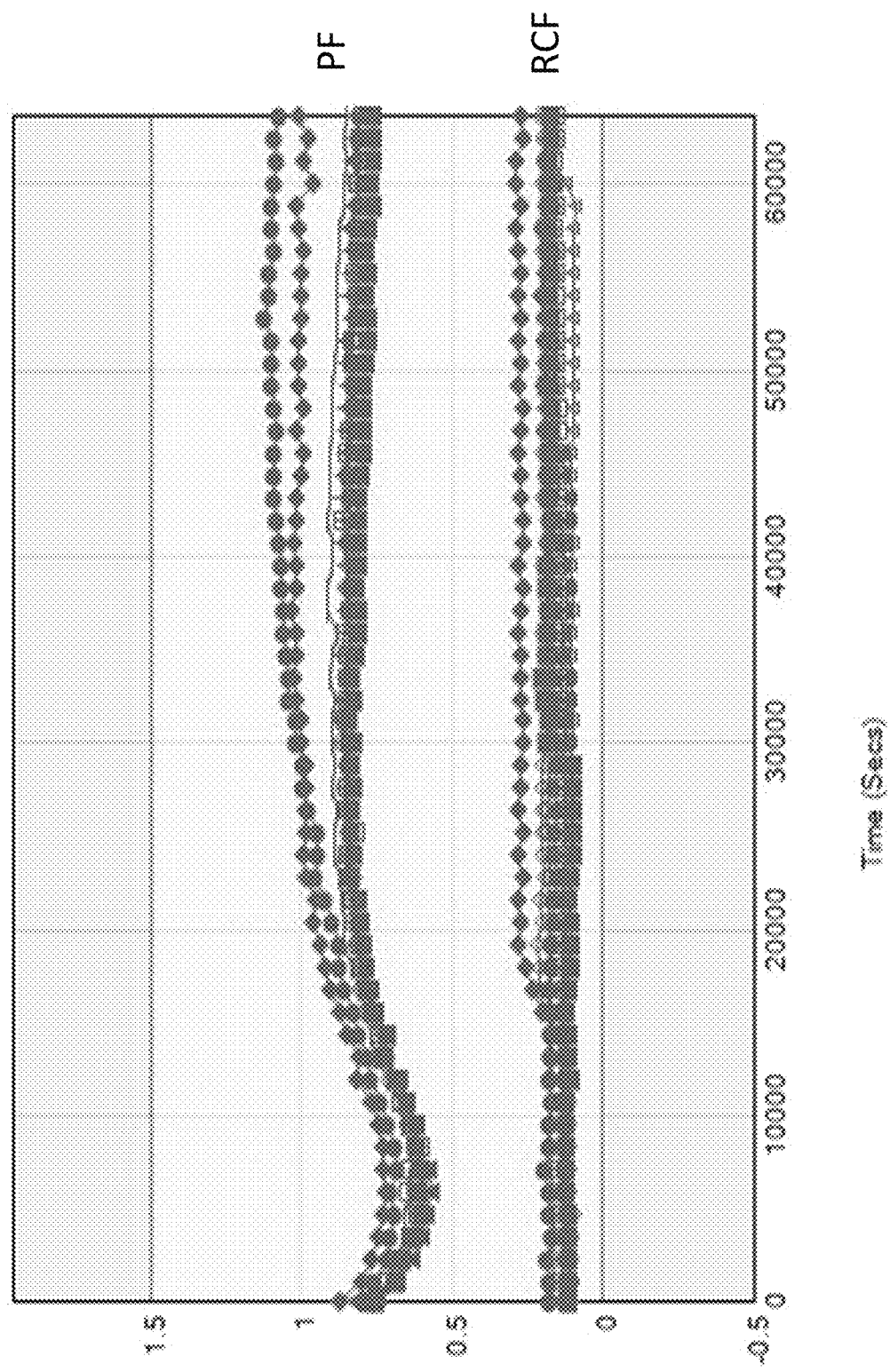
FIG. 2B presents the optical density (at 590 nm) of poultry fat (PF) and refined poultry fat (RCF) samples over 18 hours when incubated with *Salmonella*.
Figure 3:
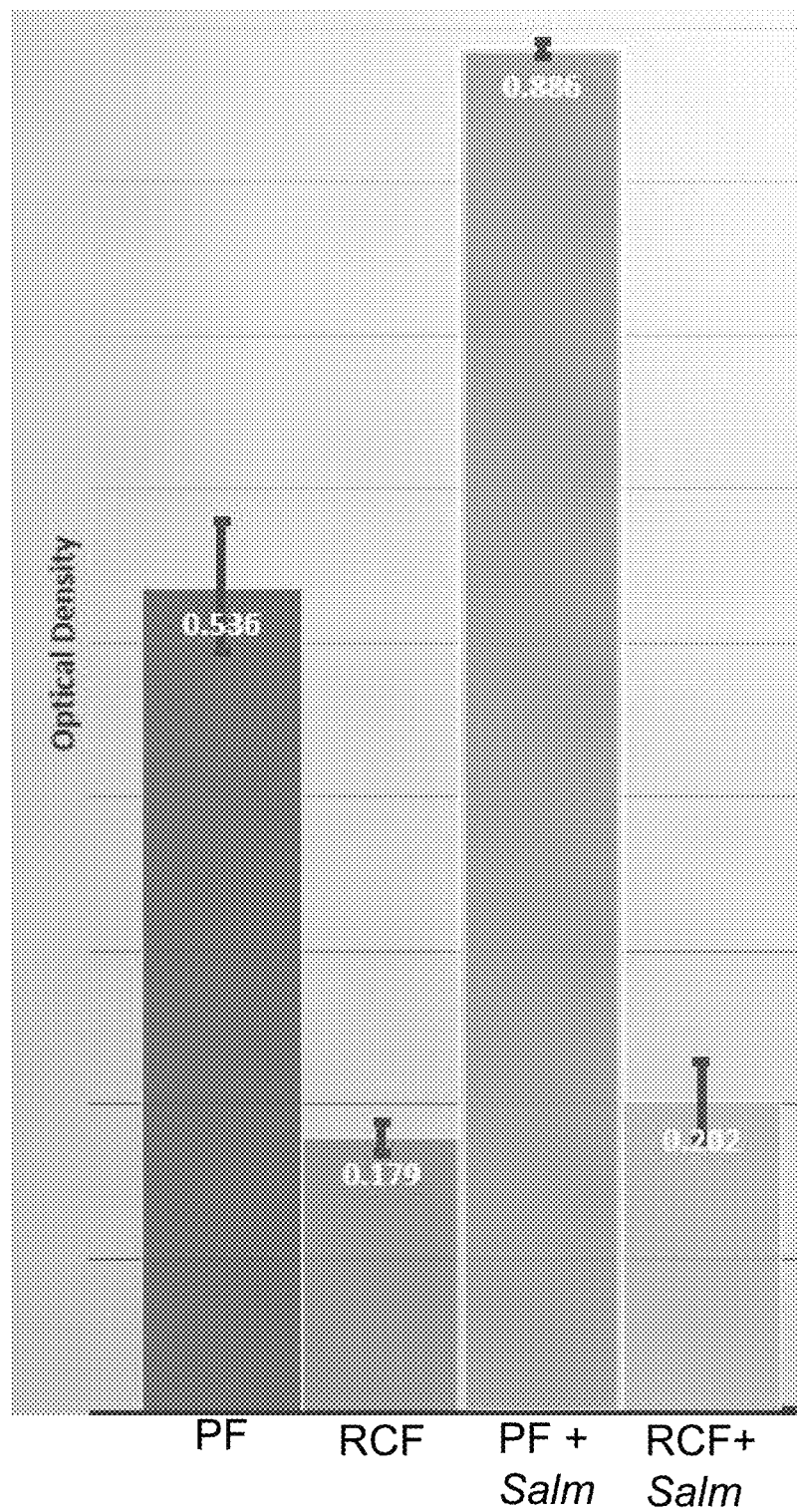
FIG. 3 plots the optical density of poultry fat (PF) ±*Salmonella*, refined poultry fat (RCF)±*Salmonella*, and control samples±*Salmonella* at the 18-hour endpoint.

FIG. 2A and FIG. 2B present kinetic growth curves in samples of poultry fat (PF) and refined poultry (chicken) fat (RCF) incubated without (FIG. 2A) or with (FIG. 2B) *Salmonella*. The optical density of each type of sample at the 18-hour endpoint is plotted in FIG. 3. *Salmonella* growth was drastically lower in the RCF than the rendered PF. The control samples exhibited essentially no *Salmonella* growth.

Example 4. Microbial Analysis of Rendered Poultry Fat and Refined Poultry Fat

Samples of rendered poultry fat (PF) and refined poultry (chicken) fat (RCF) were subjected to a whole genome shotgun microbial metagenomics analysis using high performance algorithms to search curated genome databases. The rendered poultry fat contained genomic DNA from a wide variety of bacterial species, with about 23 different species being detected. *Lactobacillus coryniformis* was the most abundant (~45%), followed by other *Lactobacillus* species (e.g., *L. brevis, L. farraginis*). The microbial diversity was greatly reduced in the refined poultry fat. The majority of the genomic DNA detected in the refined poultry fat was from two types of bacteria, e.g., Propionibacteriaceae (~71%) and *Kocuria rhizophilia* (~20%).

Example 5. Dog Food Palatability Study

Dog food was produced at a commercial facility using their standard formulation with either rendered poultry fat (PF) or refined poultry (chicken) (RCF) (both containing antioxidant) added to the kibble post-extrusion.

The palatability of the dog food was assessed by presenting 20 male and female beagles with two stainless steel bowls, each containing approximately 400 grams of the dog food, once daily for 2 days. Bowl placement was reversed daily and both bowls were presented for 30 minutes. If one diet was completely consumed prior to the end of the 30 minutes, both bowls were removed. Food consumption and first choice preference were recorded for each dog.

The kennel facility is registered with the USDA No. 23-R-0126 under the Animal Welfare Act. The kennel had a 12-hour-light/12-hour-dark cycle. Every attempt was made to keep temperature ranges within targeted conditions (from 50° to 85° F.) in accordance with the Animal Welfare Act. Cages and feed bowls were cleaned daily and sanitized in accordance with the Animal Welfare Act.

Figure 4:
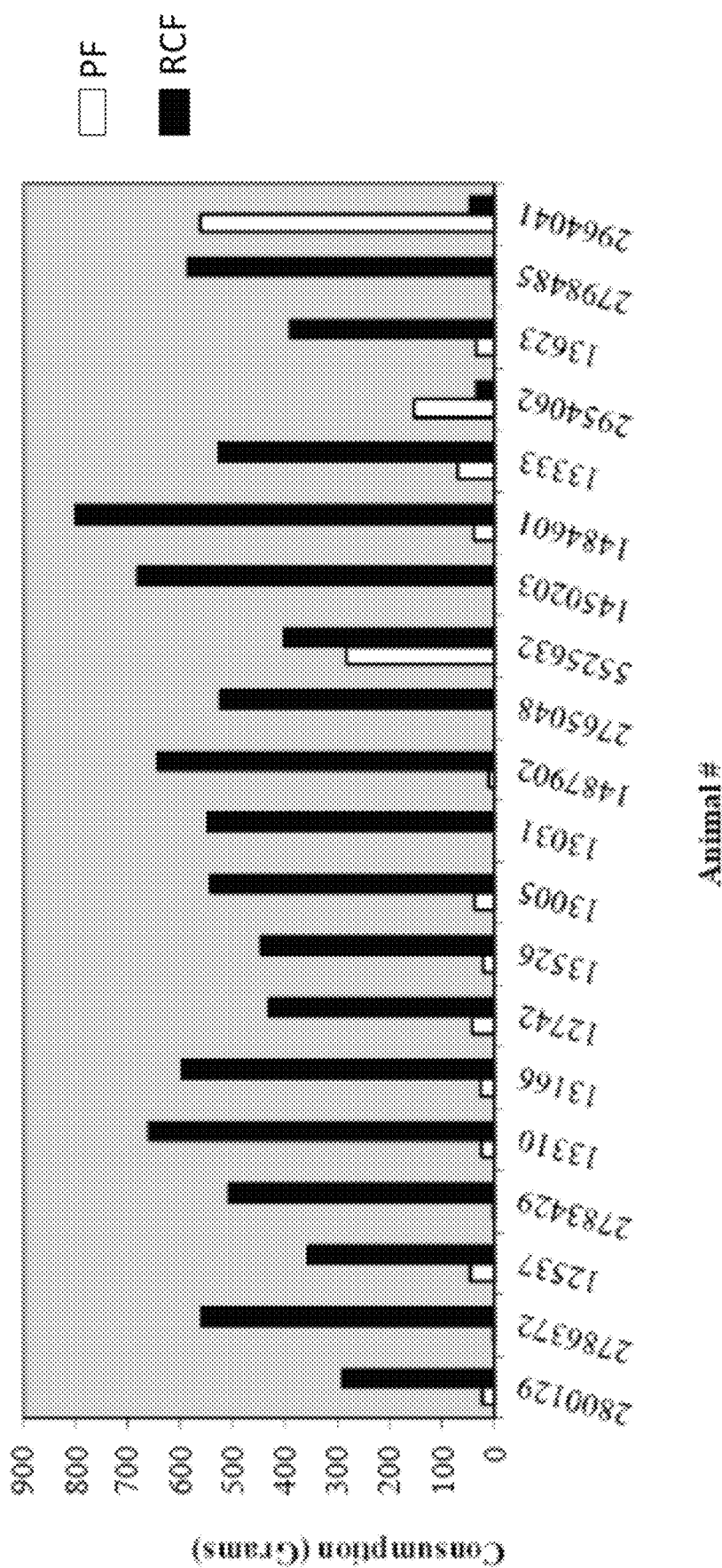
FIG. 4 presents the total consumption of dog food containing rendered poultry fat (PF) and dog food containing refined chicken fat (RCF) for each dog for two days.

The total consumption of each dog food for each dog for the two days is plotted in FIG. 4. Seventeen of the 20 dogs consumed more RCF dog food, 2 dogs consumed more PF dog food, and 1 dog consumed about equal amounts of both. There was a 9.99 to 1 consumption ratio of RCF dog food to PF dog food.

The total amount of RCF dog food consumed by all dogs over the 2 days was 9,564 g (87.5%) and the total amount of PF dog food consumed by all dogs over the 2 days was 1,369 g (12.5%). Using a Wilcoxon Signed Rank test there is significant reason to suspect a consumption difference between the two Diets (P=0.0005). A 2-way analysis of variance (2-Way ANOVA) indicates that there is significant reason to suspect a difference in consumption of the 2 diets when the variance in consumption of the dogs is accounted for (F=37.940, P=0.0000).

Figure 5:
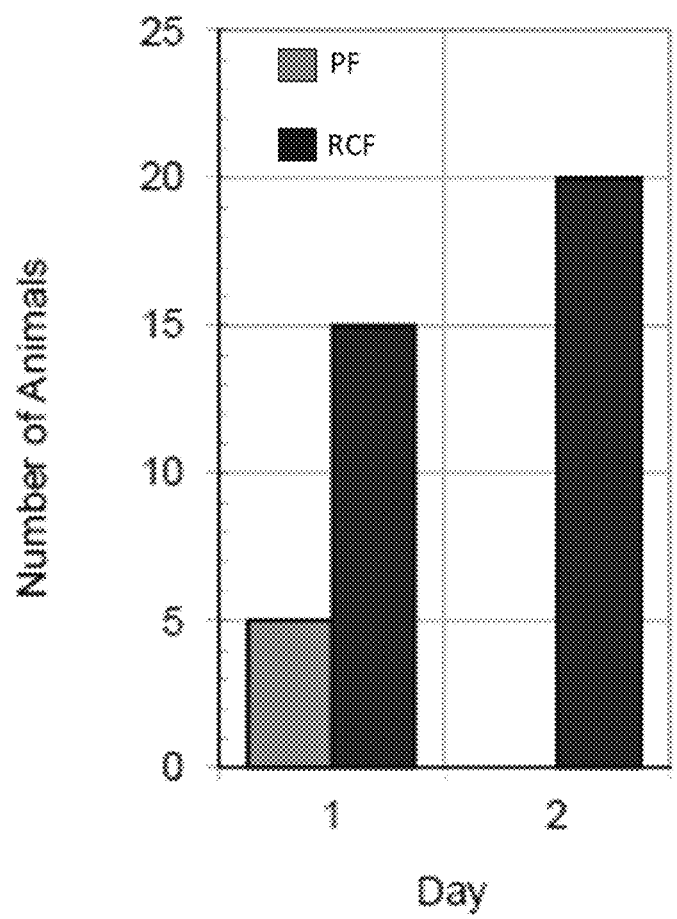
FIG. 5 presents daily preference by first choice of the two dog foods for each of the two days.

Over both days, PF dog food was chosen first on 5 occasions, and RCF dog food was chosen first on 35 occasions. Over both days 0 dogs chose PF dog food first every day and 15 dogs chose RCF dog food first every day, the other 5 were undecided. There is significant reason to suspect that this result is not random as a definite preference is detected. The Chit probability is p=0.0000. FIG. 5 presents the daily preference by first choice. Fifteen of 20 dogs chose RCF dog food first on day 1, and all the dogs chose RCF dog food first on day 2.

It is generally assumed that animals show a clear preference by consuming twice as much of one diet as the other. This is measured as a 2:1 consumption ratio or a 0.6667 Intake Ratio. Scoring is achieved by reviewing the average intake ratios for each dog in the test and scoring one point for the Diet with an Intake Ratio greater than or equal to 0.6667. The average intake ratio for the RCF dog food was 0.856 and the average intake ratio for the PF dog food was 0.144. Using the 2:1 consumption criteria, it was concluded that 17 dogs preferred the RCF dog food, 2 dogs preferred the PF dog food, and final dog showed no preference.

What is claimed is:

1. A refined poultry fat product prepared from a rendered poultry fat product, the refined poultry fat product having a moisture content of less than 1% wherein the moisture consists of water, a mineral and metal content of less than 300 ppm, and a free fatty acid content of less than about 6%, wherein when the refined poultry fat product is incubated with *Salmonella* and bacterial growth is monitored by plate optical density at 590 nm using a multiwell plate reader over a period of about 18 hours the optical density is less than 0.2 indicating essentially no bacterial growth.

2. The refined poultry fat product of claim 1, wherein the mineral and metal content is less than 200 ppm.

3. The refined poultry fat product of claim 2, wherein the mineral and metal content is less than 100 ppm.

4. The refined poultry fat product of claim 1, wherein the mineral and metal content comprises calcium, iron, lead, magnesium, phosphorus, sulfur, or a combination thereof.

5. The refined poultry fat product of claim 1, wherein the *Salmonella* is *Salmonella enterica, Salmonella bongori*, or a combination thereof.

6. The refined poultry fat product of claim 1, wherein resistance to bacterial growth occurs in the presence of up to about 5% of water by weight.

7. The refined poultry fat product of claim 1, which has a peroxide value of less than about 5 milliequivalents/kg and/or has a Gardner color score of 10 or less.

8. The refined poultry fat product of claim 1, wherein the poultry fat is chicken fat.

9. A pet food product comprising the refined poultry fat product of claim 1.

10. The pet food product of claim 9, which is a dry kibble, pellet, crumble, biscuit, chew, twist, crunch, or cookie.

11. The pet food product of claim 9, which has increased palatability over a pet food product comprising unpurified rendered poultry fat as determined by a dog food palatability study.

12. A refined poultry fat product comprising less than 300 ppm of minerals and metals, which is prepared from a rendered poultry fat product by a process in which water-soluble impurities and particulate impurities in the rendered poultry fat coalesce with particles of water to form water-laden particles, and the water laden-particles are removed to form the refined poultry fat product.

13. A process for preparing the refined poultry fat product of claim 1, the process comprising:
(a) introducing water or steam into the rendered poultry fat product to form a hydrated poultry fat product;
(b) agitating and heating the hydrated poultry fat product to a temperature of less than about 100° C. such that droplets of water are dispersed throughout and coalesce with water-soluble impurities and particulate impurities in the hydrated poultry fat product to form a plurality of water-laden particles; and
(c) removing the plurality of water-laden particles, thereby forming the refined poultry fat product.

14. The process of claim 13, wherein step (a) comprises injecting steam into the rendered poultry fat.

15. The process of claim 13, wherein the hydrated poultry fat product has a water content from about 2% to about 5% by weight.

16. The process of claim 13, wherein step (c) comprises allowing the plurality of water-laden particles to settle by gravity.

17. The process of claim 16, further comprising a centrifugation step.

18. A refined poultry fat product prepared from a rendered poultry fat product, the refined poultry fat product having a moisture content of less than 1% wherein the moisture consists of water, and a free fatty acid content of less than about 3%, wherein when the refined poultry fat product is incubated with *Salmonella* and bacterial growth is monitored by plate optical density at 590 nm using a multiwell plate reader over a period of about 18 hours the optical density is less than 0.2 indicating essentially no bacterial growth.

* * * * *